United States Patent [19]

Serrano

[11] Patent Number: 5,660,584
[45] Date of Patent: Aug. 26, 1997

[54] RETROFIT MOBILE HOME AIR CONDITIONING DISTRIBUTION ASSEMBLY

[76] Inventor: Ricardo Serrano, 820 SW. 133 Ave. #410, Kendall, Fla. 33183

[21] Appl. No.: 529,579

[22] Filed: Sep. 18, 1995

[51] Int. Cl.⁶ ............................................. F24F 13/06
[52] U.S. Cl. .......................... 454/108; 454/137; 454/306; 454/324; 454/334
[58] Field of Search ........................... 454/108, 109, 454/137, 306, 324, 334

[56] References Cited

U.S. PATENT DOCUMENTS

| 169,777 | 11/1875 | Culp | 454/334 X |
|---|---|---|---|
| 2,032,572 | 3/1936 | Hammers et al. | 454/137 X |
| 2,350,514 | 6/1944 | Livar | 454/306 |
| 4,850,266 | 7/1989 | Bennett | 454/306 X |
| 4,852,470 | 8/1989 | Corriveau | 454/306 X |
| 5,501,634 | 3/1996 | Wilder | 454/109 X |
| 5,531,641 | 7/1996 | Aldrich | 454/137 X |

FOREIGN PATENT DOCUMENTS

| 60-92923 | 5/1985 | Japan | 454/137 |
|---|---|---|---|
| 525222 | 8/1940 | United Kingdom | 454/306 |
| 2 124 751 | 2/1984 | United Kingdom | 454/137 |

*Primary Examiner*—Harold Joyce

[57] ABSTRACT

The distribution assembly is arranged for mounting to a ceiling portion of an existing mobile home, that in turn includes an existing air conditioning outlet housing. The assembly employs a central plenum housing arranged to receive the air conditioning outlet housing while permitting securement by a flange of the central plenum housing to the ceiling in surrounding relationship relative to the outlet housing. A distribution duct in pneumatic communication with the central plenum housing extends therefrom in pneumatic communication therewith. The distribution duct and the central plenum housing each employ a plurality of windows having sliding doors to permit various air flow from within the central plenum housing and the duct for distribution throughout an interior compartment of an existing mobile home.

8 Claims, 3 Drawing Sheets

RETROFIT MOBILE HOME AIR CONDITIONING DISTRIBUTION ASSEMBLY

TECHNICAL FIELD

The field of invention relates to mobile home air conditioning units, wherein the instant invention is directed to improvements thereover by providing a retrofit distribution manifold assembly arranged for surrounding in an existing air conditioning outlet housing permitting distribution of coolant air throughout the elongate interior compartment within the associated mobile home.

BACKGROUND OF THE INVENTION

Air conditioning units of various types having intricate assemblies are typically employed in the prior art and may be exemplified by the U.S. Pat. Nos. 5,321,581; 4,991,646; 4,909,310; and 4,401,149.

The distribution assembly of the instant invention is arranged to overcome shortcomings in the prior art by providing for a relatively simple and effective manifold assembly arranged to be retrofitted and secured within a mobile home for distribution of coolant air therewithin.

SUMMARY OF THE INVENTION

The distribution assembly of the invention is arranged for mounting to a ceiling portion of an existing mobile home, that in turn includes an existing air conditioning outlet housing. The assembly of the invention employs a central plenum housing arranged to receive the air conditioning outlet housing while permitting securement by a flange of the central plenum housing to the ceiling in surrounding relationship relative to the outlet housing. A distribution duct in pneumatic communication with the central plenum housing extends therefrom in pneumatic communication therewith. The distribution duct and the central plenum housing each employ a plurality of windows having sliding doors to permit various air flow from within the central plenum housing and the duct for distribution throughout an interior compartment of an existing mobile home.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
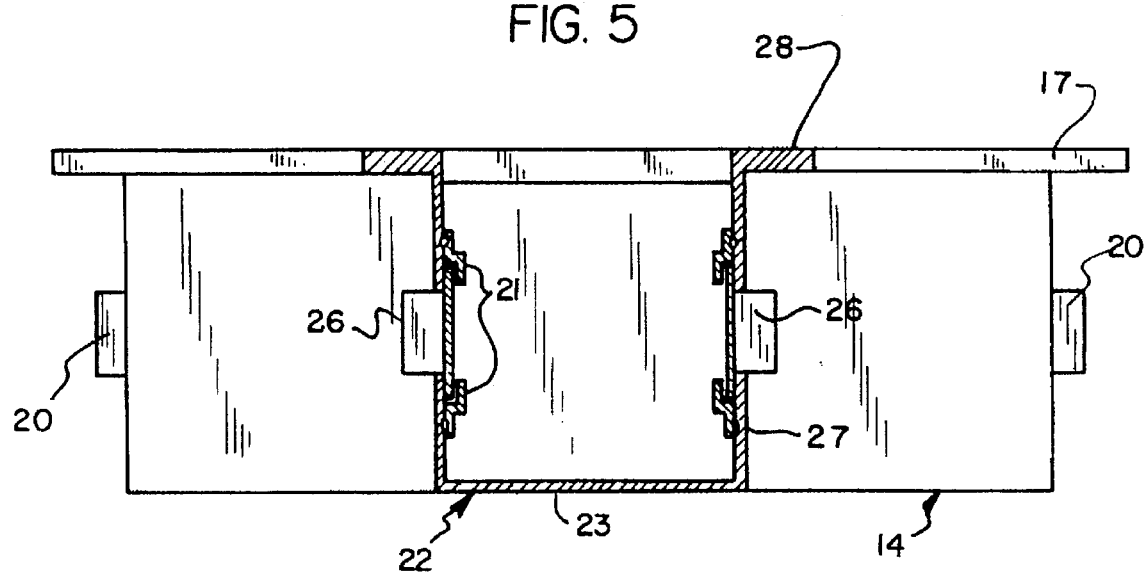
FIG. 5 is a cross-sectional view, taken along the lines 5—5 of FIG. 4 as indicated.

The retrofit mobile home air conditioning distribution assembly 10 of the invention is arranged as a manner and process of permitting a more efficient distribution of coolant air for a conventional or existing air conditioning system relative to a mobile home and like structure. To this end, the mobile home includes a mobile home interior cavity 11 (see FIG. 1) formed with a ceiling 12 having an existing air conditioning outlet housing 13 extending from the ceiling 12. The distribution structure of the invention is provided to include a central plenum housing 14 having a primary floor plate 15, as well as a continuous primary side wall 16 and extending from the primary side wall 16 is a primary mounting flange 17 arranged for fastening to the ceiling 12 utilizing adhesives, mechanical fasteners, and the like. First windows 18 are directed through the primary side wall 16, with each of the windows including a first slide door 19, and each of the slide doors 19 having a first handle 20. Each of the slide doors 19 are guided within a pair of guide tracks 21 oriented within the plenum housing 14, in a manner as illustrated relative to FIG. 5, and the distribution duct 22 but for purposes of illustration, it should be understood that the guide tracks 21 are identical for use within the central plenum housing 14, as well as the distribution duct 22. Note that the central plenum housing 14 may have slide door structures 18, 19, 20 continuously about the primary side wall 16, as illustrated in phantom in FIGS. 1 and 2 for example.

The distribution duct 22 is arranged in pneumatic communication with the central plenum housing 14 and extending through the primary side wall 16 to this end, in a manner as illustrated. The distribution duct 22 includes a distribution duct floor 23, as well as a duct side wall 27 having spaced second window openings 24 directed through the duct side wall 27. The second window openings 24 each include a second door 25, each having a second handle 26. A second flange 28 extending from the duct side wall 27 is coplanar with and extends from the primary mounting flange 17, as formed and illustrated in the FIGS. 1–5. The distribution duct floor may also be optionally provided with adjustable openings, as illustrated in phamton in FIG. 1.

Figure 1:
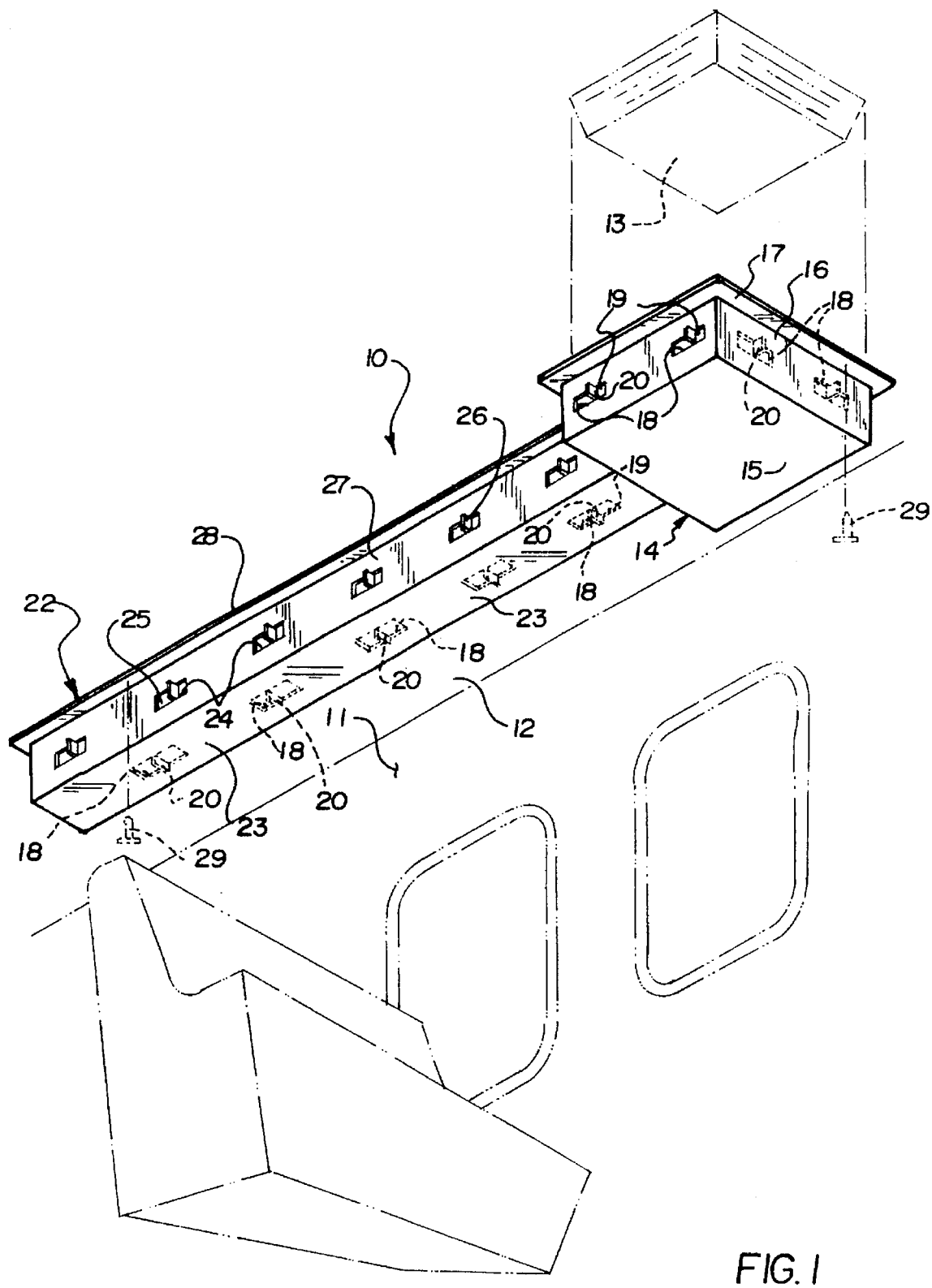
FIG. 1 is a perspective illustration of the invention arranged for securement to a ceiling portion of a mobile home.
Figure 2:
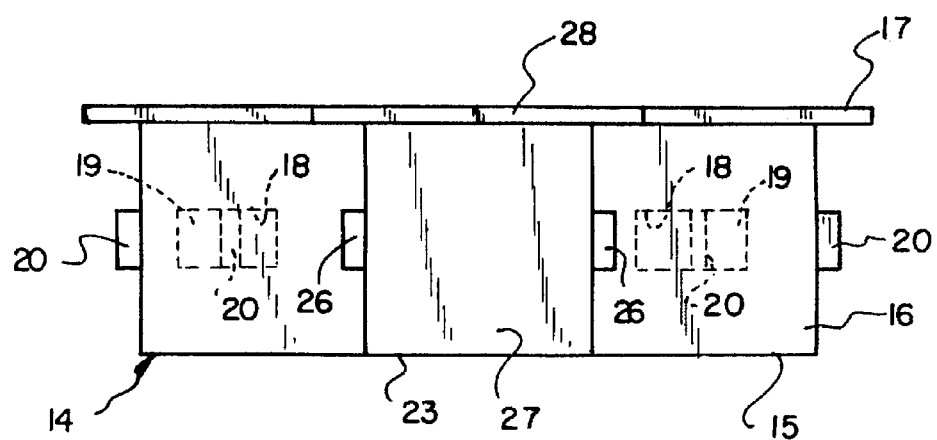
FIG. 2 is an end view, taken in elevation, of the distribution assembly.
Figure 3:
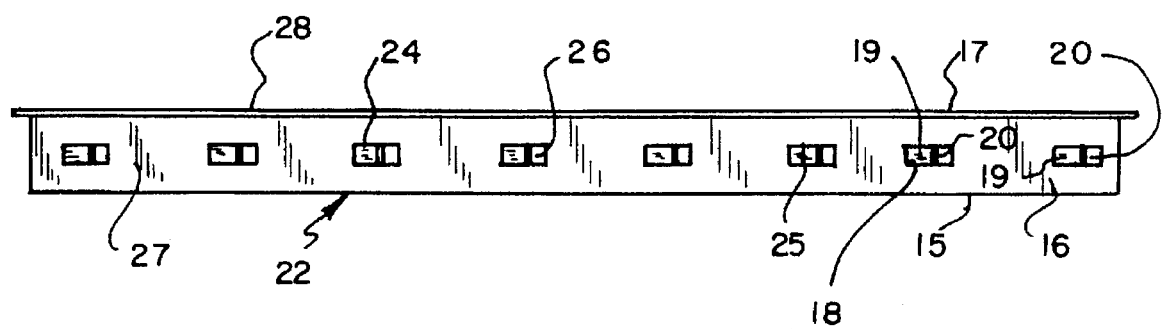
FIG. 3 is a side view, taken in elevation, of the distribution assembly as indicated in FIG. 2.
Figure 4:
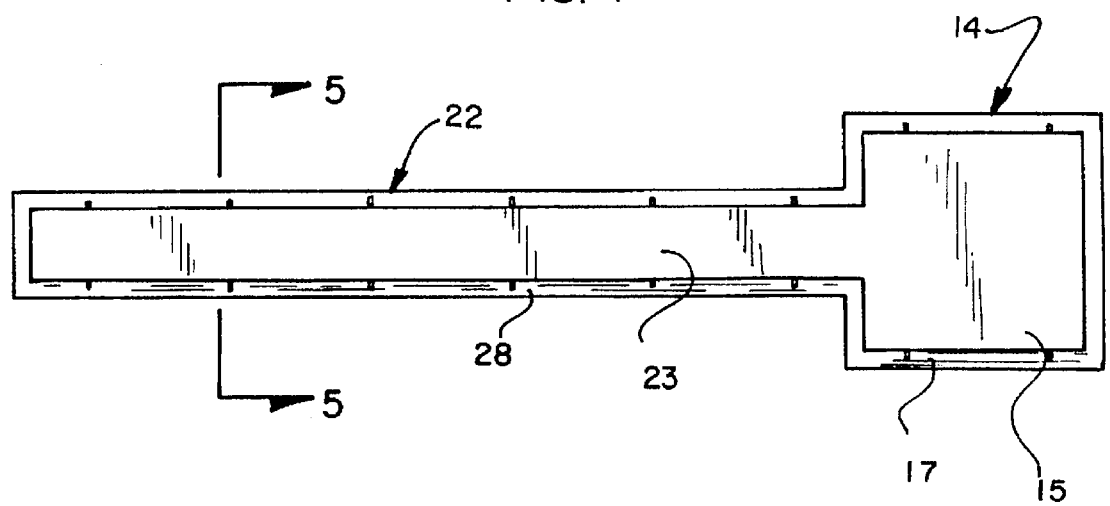
FIG. 4 is a bottom plan view of the distribution assembly.

Accordingly, the central plenum housing 14 and the distribution duct 22 are arranged for fastening to the ceiling 12, and it should be understood that the second flange 28 is also arranged to employ either mechanical or adhesives to secure the distribution duct 22 along with the central plenum housing 14 to the ceiling 12. The central plenum housing 14 then receives the outlet housing 13 and to this end is arranged in a surrounding and enclosing relationship relative to the outlet housing 13, in a manner as indicated in FIG. 1. Subsequently upon positioning the outlet housing 13 within the central plenum housing 14, the distribution duct 22 is oriented as desired for permitting the greatest and most even distribution of coolant air throughout the living quarters of the mobile home interior cavity 11, and then by employing whatever fastening means may be desired, the flanges 17 and 28 are directed in contiguous communication with the ceiling 12. Typically, mechanical fasteners 29, as exemplified in FIG. 1, may be employed directed through the flange structures 17 and 28 into the ceiling 12.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A method of retrofitting a distribution assembly to a mobile home air conditioning system, wherein a mobile home is provided including a ceiling and an existing air conditioning outlet housing projects from the ceiling, wherein the method comprises, providing a central plenum housing, the central plenum housing having a continuous primary side wall and a plurality of windows directed through the side wall, and positioning the central plenum housing in surrounding relationship relative to the outlet housing, and providing the primary side wall with a primary mounting flange, and securing the primary mounting flange to the ceiling, and wherein the step of providing the central plenum housing further includes the step of providing a distribution duct in fixed pneumatic communication with the central plenum housing, and providing the distribution duct with a distribution duct side wall, and providing the distribution duct side wall with a second flange, and securing the second flange to the ceiling, and providing the distribution duct with a plurality of distribution duct windows directed through the distribution duct side wall.

2. A method as set forth in claim 1 wherein the step of providing the central plenum housing further includes the step of providing each of the windows with a first slide door arranged for permitting selective sliding of each of the slide doors relative to one of said windows.

3. A method as set forth in claim 1 wherein the step of providing the distribution duct includes providing a distribution duct floor having at least one floor window arranged for opening and closing to permit selective air flow therethrough.

4. A method as set forth in claim 1 wherein the step of providing the distribution duct further includes the step of providing at least one of the distribution duct windows with a distribution duct door in sliding relationship to said at least one of said distribution duct windows.

5. A retrofit distribution assembly for a mobile home air conditioning system wherein a mobile home is provided including a ceiling and an existing air conditioning outlet housing projecting from the ceiling, wherein the distribution assembly comprises, a central plenum housing, the central plenum housing having a continuous primary side wall and a plurality of windows directed through the side wall, the central plenum housing being positioned in surrounding relationship relative to the outlet housing, the primary side wall with a primary mounting flange, and wherein the primary mounting flange is secured to the ceiling, and a distribution duct in fixed pneumatic communication with the central plenum housing, the distribution duct having a distribution duct side wall, and the distribution duct side wall having a second flange, wherein the second flange is secured to the ceiling, and wherein the distribution duct is further provided with a plurality of distribution duct windows directed through the distribution duct side wall.

6. An assembly as set forth in claim 5 wherein each of the windows of the central plenum housing further includes a first slide door arranged for permitting selective sliding of each of the slide doors relative to said windows.

7. An assembly as set forth in claim 5, wherein the distribution duct includes a distribution duct floor having at least one floor window arranged for opening and closing to permit selective air flow therethrough.

8. An assembly as set forth in claim 5 wherein at least one of the distribution duct windows includes a distribution duct door in sliding relationship relative to said at least one of said distribution duct windows.

* * * * *